United States Patent
Comploi et al.

(10) Patent No.: US 11,315,298 B2
(45) Date of Patent: Apr. 26, 2022

(54) PERSONALIZED STYLIZED AVATARS

(71) Applicant: Disney Enterprises, Inc., Burbank, CA (US)

(72) Inventors: Dumene Comploi, Los Angeles, CA (US); Francisco E. Gonzalez, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/363,640

(22) Filed: Mar. 25, 2019

(65) Prior Publication Data

US 2020/0312002 A1    Oct. 1, 2020

(51) Int. Cl.
  *G06T 13/40* (2011.01)
  *G06T 17/20* (2006.01)
  *G06T 7/50* (2017.01)
  *G06K 9/00* (2022.01)

(52) U.S. Cl.
  CPC .......... *G06T 13/40* (2013.01); *G06K 9/00288* (2013.01); *G06T 7/50* (2017.01); *G06T 17/20* (2013.01); *G06T 2207/30201* (2013.01)

(58) Field of Classification Search
  None
  See application file for complete search history.

(56) References Cited

U.S. PATENT DOCUMENTS

| | | | | |
|---|---|---|---|---|
| 10,452,896 | B1* | 10/2019 | Weise | G06K 9/00281 |
| 2016/0086017 | A1* | 3/2016 | Rodriguez | G06K 9/00275 |
| | | | | 382/118 |
| 2018/0374242 | A1* | 12/2018 | Li | G06T 15/04 |
| 2019/0147676 | A1* | 5/2019 | Madzhunkov | G06K 9/00214 |
| | | | | 340/5.2 |
| 2019/0265945 | A1* | 8/2019 | Newell | G06F 3/04842 |
| 2020/0051303 | A1* | 2/2020 | Li | G06T 13/40 |

OTHER PUBLICATIONS

Bouaziz, Sofien, Yangang Wang, and Mark Pauly. "Online modeling for realtime facial animation." ACM Transactions on Graphics (ToG) 32.4 (2013): 40.*

Blanz, Volker, and Thomas Vetter. "A morphable model for the synthesis of 3D faces." Siggraph. vol. 99. No. 1999. 1999.*

Zhang L, Verma B, Tjondronegoro D, Chandran V. Facial expression analysis under partial occlusion: A survey. ACM Computing Surveys (CSUR). Jun. 2, 2018;51(2):25.*

(Continued)

*Primary Examiner* — Yu Chen
(74) *Attorney, Agent, or Firm* — Dorsey & Whitney LLP

(57) ABSTRACT

The present disclosure is related to a method to generate user representative avatars that fit within a design paradigm. The method includes receiving depth information corresponding to multiple user features of the user, determining one or more feature landmarks for the user based on the depth information, utilizing the one or more feature landmarks to classify a first user feature relative to an avatar feature category, selecting a first avatar feature from the avatar feature category based on the classification of the first user feature, combining the first avatar feature within an avatar representation to generate a user avatar, and output the user avatar for display.

17 Claims, 7 Drawing Sheets

(56) References Cited

OTHER PUBLICATIONS

Hu, Liwen, et al. "Avatar digitization from a single image for real-time rendering." ACM Transactions on Graphics (ToG) 36.6 (2017): 1-14.*
Conde, Cristina, Licesio J. Rodriguez-Aragón, and Enrique Cabello. "Automatic 3D face feature points extraction with spin images." International Conference Image Analysis and Recognition. Springer, Berlin, Heidelberg, 2006.*

* cited by examiner

PERSONALIZED STYLIZED AVATARS

FIELD

The present disclosure relates generally to generating avatars or other user representations for media, interactive content, and other applications.

BACKGROUND

Avatars or other graphic representations of users, characters, or objects are used in many applications, such as video games, interactive content, images, electronic communication (e.g., texting), instant messaging, and the like. Often, it is desirable to include individualized features on an avatar that allow a user to more closely resemble the avatar and allow others to identify a particular avatar as corresponding to a user, e.g., have a user's likeness. Additionally, in many instances, there is a desire to have avatars that match within a particular "style" or design framework (e.g., match character design elements).

Current avatar generation systems do not balance the competing factors of user likeness with design paradigms and select one factor over the other. For example, many video games will allow a user to vary certain colors of a character, but these colors are previously stored options and while may happen to match the user are not selected so as to match the user. In other examples, the avatars may be generated within a design paradigm, but do not resemble the user. In many instances, avatars need to be "manually" created, with a user actively selecting the particular avatar features that the user wishes to include on their own avatar, which is time consuming and often leads to inaccurate individual representations of a user.

SUMMARY

According to one embodiment, a method to generate user representative avatars that fit within a design paradigm is disclosed. The method includes receiving depth information corresponding to multiple user features of the user, determining one or more feature landmarks for the user based on the depth information, utilizing the one or more feature landmarks to classify a first user feature relative to an avatar feature category, selecting a first avatar feature from the avatar feature category based on the classification of the first user feature, combining the first avatar feature within an avatar representation to generate a user avatar, and output the user avatar for display.

According to another embodiment, a system for generating graphical representations of a person is disclosed. The system includes a camera for capturing images of the person and a computer in electronic communication with the camera. The computer includes a non-transitory memory component for storing a plurality of graphical features and a processor in electronic communication with the memory component. The processor is configured to perform operations including: receive the captured images of the person, determine from the captured images a plurality of facial landmarks for the person, utilize the plurality of facial landmarks to classify a first facial feature within a first graphical feature category and a second facial feature within a second graphical feature category, select a first graphical feature and a second graphical feature based on the classification, and combine the first graphical feature and the second graphical feature According to yet another embodiment, a method to generate user-corresponding avatars is disclosed. The method includes, receiving by a processor depth information corresponding to multiple facial features of a user, detecting by analyzing the depth information by the processor, locations of the multiple facial features, quantizing by the processor, the facial features into a respective avatar facial feature type, selecting avatar facial feature elements to represent the user-corresponding avatar based on the respective facial feature type and the depth information, generate the user-corresponding avatar by combining the avatar facial elements together, and outputting by the processor to a display the user-corresponding avatar for display.

SPECIFICATION

Figure 1:
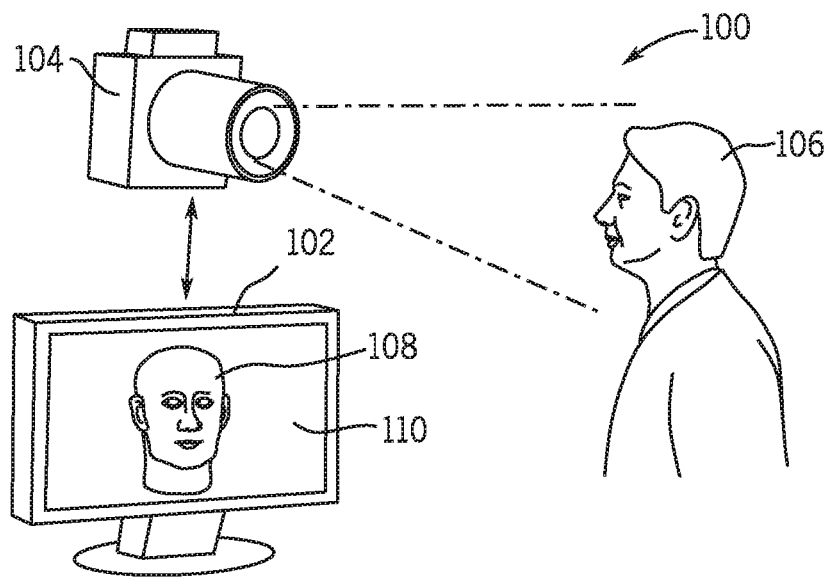
FIG. 1 is a perspective view of a system for generating personalized stylized avatars.

The present disclosure is related to a method to generate personalized, stylized avatars that maintain a design paradigm, while also including individualized user likeness. The method includes capturing color and depth information for a user, such as via color images and/or depth scans of the user. Based on detected user information, user characteristics, such as facial and hair shapes, colors, and attributes (e.g., coarse hair, curly hair, etc.), are analyzed and classified or matched relative to a stored database of design paradigm features. For example, a hairline shape for the user is extracted from the user images and the shape is classified and matched to a selected paradigm shape, which is then used to build the user's avatar. As another example, the user's skin and eye color are extracted and classified within a paradigm scale to be matched to a paradigm selection of skin and eye color. In some instances the avatar selectable features are scaled or quantized such that the selected color/feature may not exactly match the user, but fits within the selected category of the desired character design. That is, the selected avatar features/colors may not be exact replicas of the user, but representations generally of user features/colors to correspond to the user but fit within the selected design environment.

In addition to the coloring and shape characteristics, the method also takes into account facial shape, structure, or other three-dimensional (3D) information. For example, using the detected user information, a geometric mesh corresponding to the user's facial features is generated. The 3D mesh is aligned and then wrapped over a generic 3D mesh (e.g., bio mesh), so that landmarks (e.g., nose, lips, eyes, ears) are aligned between the two meshes. The wrapping allows the user's features to be more accurately measured and grouped so as to be more fairly and accurately compared to corresponding avatar 3D features. In other words, the wrapped mesh may be scaled to the avatar features such that missing or inaccurate data from the user geometric mesh can be accommodated for and different user landmark measurements (e.g., nose eight, eye width, etc.) are analyzed accurately.

Using the wrapped mesh, the 3D landmarks are measured and compared or classified relative to selected or stored avatar or design features, where the stored avatar features are designed to match an avatar design paradigm. In one example, a user nose width spanning across X number of mesh vertices or X inches may be compared against paradigm nose sizes, such as small, medium, and large, where each nose size has a vertices or inches interval (e.g., 0.3 to 0.6 inches is a small nose, 0.65-0.9 is a medium nose, etc.). Once the nose or other 3D feature is classified, the corresponding avatar 3D feature size and shape is selected based on the classification and applied to the 3D mesh. The 3D features are applied to the wrapped mesh and the user specific built 3D mesh is combined with the shape and color features classified and a complete user specific avatar can be generated.

It should be noted that as used herein, the term "user" may encompass an operator of the system and/or software and/or a participant whose likeness is being used to generate the avatar. For example, in some instances, the user may be the subject of the personalized avatar, but may not operate or control the software.

Figure 2:
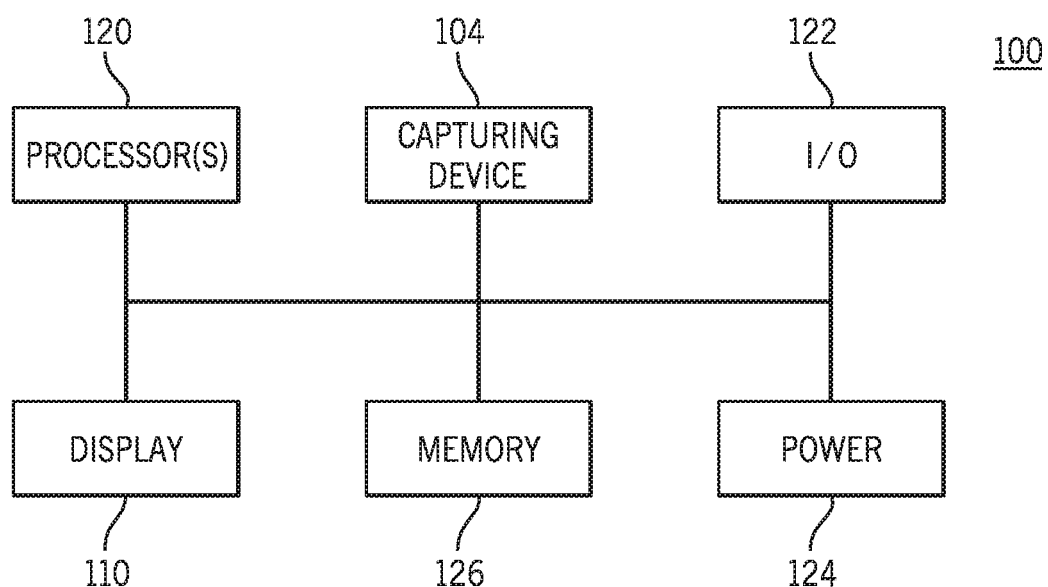
FIG. 2 is a simplified block diagram of the system of FIG. 1.

FIG. 1 illustrates a perspective view of an avatar system 100 for generating personalized stylized avatars for users 106. FIG. 2 is a simplified block diagram of the system 100. The system 100 includes a computer 102, user capturing device 104, such as a camera and/or depth sensor, and a display 110 for displaying an electronic representation of the user, such as an avatar 108. The computer 102 and the user capturing device 104 are in communication with one another, such that data (e.g., images) can be transferred between the two devices and the capturing device 104 is in optical communication with a user 106 to allow the device to capture various information, such as images and depth information, of the user. The computer 102, capturing device 104, and display 108 may incorporated into a single device, be separate devices, or a combination of the two. The components may be in communication in various ways, e.g., direct wired communication, radio waves (e.g., WiFi, Bluetooth, etc.), or a combination of communication mechanisms.

The user capturing device 104 or camera is any device that can capture images of a user 106, including visible and/or non-visible light. The camera 104 typically includes a lens and an image sensor. The type of image sensor and lens are typically varied based on the camera, as well as the type of user information to be captured (e.g., two-dimensional (2D) or 3D information). In many examples the camera 104 is captures color images that may be perceived by human vision. However, in other embodiments the camera may be configured to capture primary light channels outside the range of human visual perception.

The capture device 104 may include features to allow depth or 3D information detection for the user. For example, the capture device 104 may include two or more cameras positioned at different locations relative to the user 106 (e.g., active stereo methods), as well as a projector to project light (e.g., infrared light, collimated or laser light) onto the user 106 to detect reflection and other characteristics of the light as it reflects from the user 106. Other depth sensors or depth sensing techniques may be used as well. The determined depth information may include topography information for the user's facial features, such as x, y, z points stored in a point cloud where the various points corresponds to the outer surface features of the user's face.

The capture or depth determining device may be varied depending on the implementation of the system. In one example, a light based sensor, such as infrared camera, or a light detection and ranging (LIDAR), ultrasound detectors, and other types system can be used. In one example, one or more high speed cameras can be used that takes multiple video frames per second (e.g., 1,000-3,000 and preferably around 2,000 fps) that can be to quickly map a user's 3D facial features. In another example, an artificial intelligent (AI) model can be used analyze 2D user images and estimate the user's 3D depth information. In this example, the AI model may be trained by a number of facial images and to estimate depth information that can be used to provide a unique avatar that is identifiable as a particular user. In many embodiments, the system can be configured to detect a minimum amount of depth information that allows the user to be uniquely identified within the avatar paradigm.

In another example, the capture device 104 may be an infrared sensor that includes an IR emitter and a sensor, where the emitter emits IR light and the sensor detects the reflectivity of the light from the subject. In this example, the user may be positioned in front of an IR absorbing background to enhance the detectability of the facial features.

The display 110 is any type of device that can display images, such as a liquid crystal display, organic light emitting diode display, plasma display, or the like. The display 110 should be configured to display animated still or moving images, such as those corresponding to the avatar 108. The display 110 may be incorporated into a user device (e.g., tablet, smartphone, or the like), and/or a computational display to use for generation of the avatars 108 and that transmits the avatar 108 to a separate display for the user.

With reference to FIG. 2, the computer 102 may include a processing element 120, input/output interface 122, a power source 124, and one or more memory components 126, each of which, either individually or collectively, may be in communication with the display 110 and capture device 104.

The processing element 120 or processor is substantially any electronic device capable of processing, receiving, and/or transmitting instructions, including a graphics processing unit, central processing unit, server, processor, or the like. The memory 126 stores electronic data used by the processor 120, such as instructions to execute certain instructions, or the like. The memory 126 may store electrical data or content, such as, but not limited to, audio files, video files, document files, 3D user information, avatar paradigm classes, and the like. The memory 126 may be, for example, magneto-optical storage, read only memory, random access memory, erasable programmable memory, flash memory, or a combination of one or more types of memory components.

The input/output interface 122 provides communication to and from the computer 102, the capture device 104, and/or display 110, as well as other devices. The input/output interface 122 can include one or more input buttons, a communication interface, such as WiFi, Ethernet, or the like, as well as other communication components such as universal serial bus (USB) cables, or the like. The power source 124 may be a battery, power cord, or other element configured to transmit power to the components of the projectors.

Figure 3:
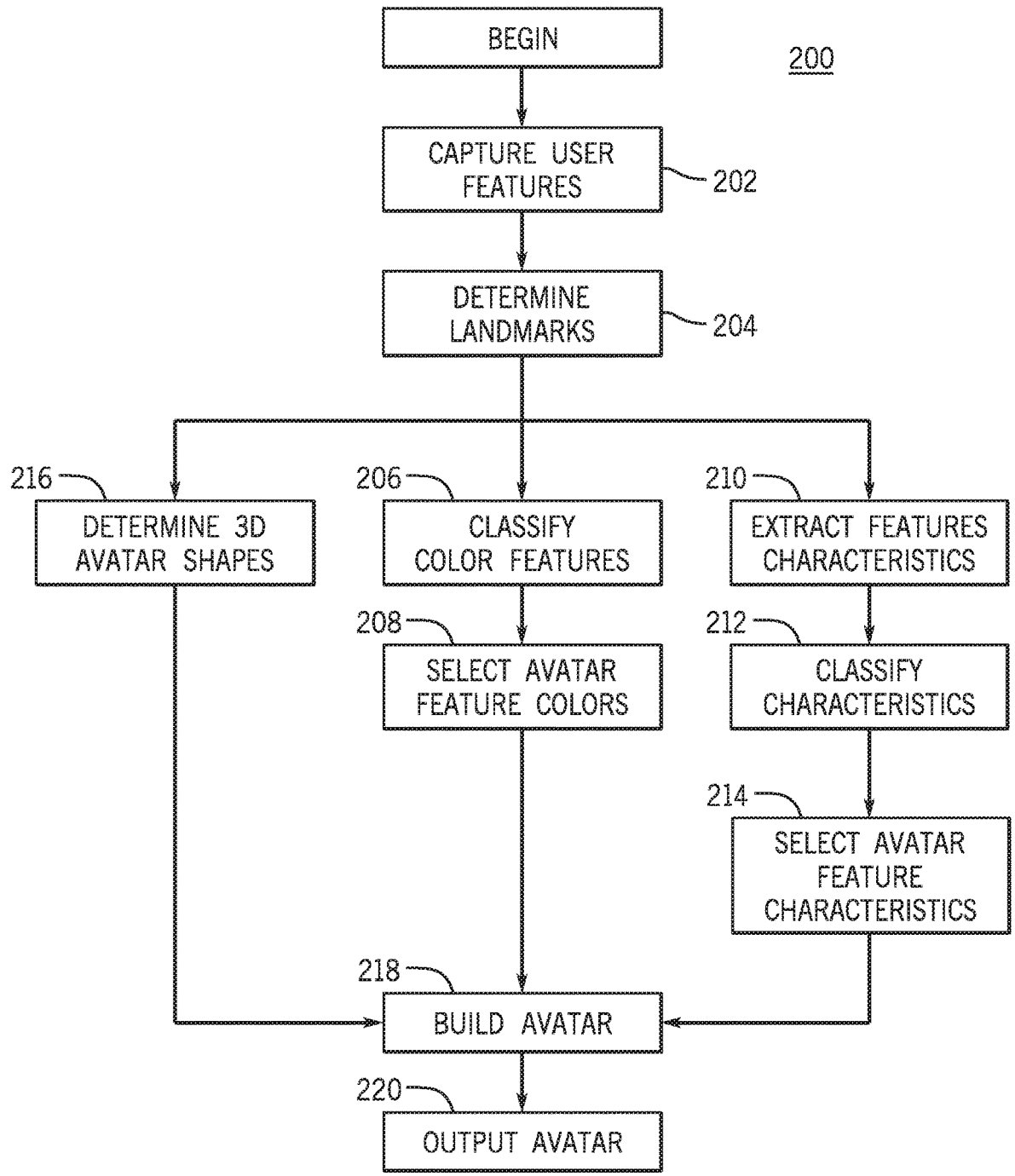
FIG. 3 is a flow chart illustrating a method to utilize the system of FIG. 1 to generate personalized stylized avatars.
Figure 5:
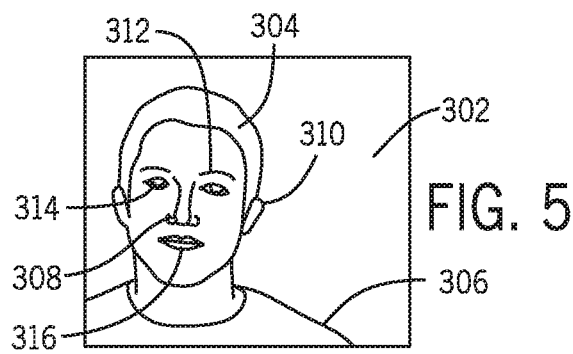
FIG. 5 is an illustrative user image captured by the system of FIG. 1.
Figure 6:
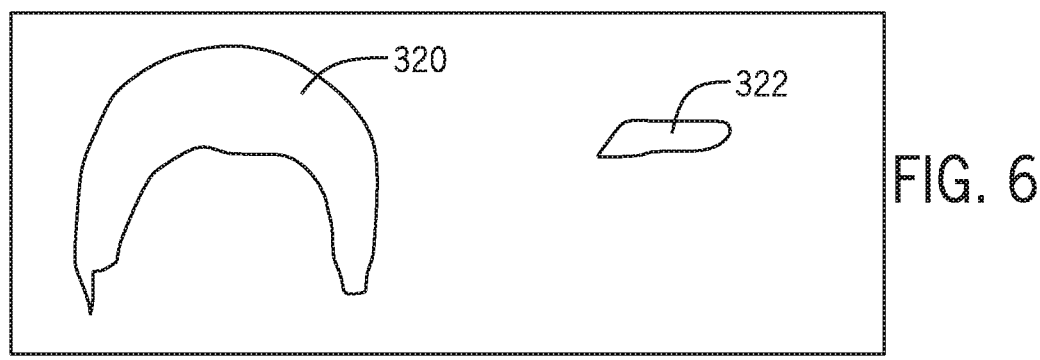
FIG. 6 is an image of a feature mask used during the method of FIG. 3.

FIG. 3 illustrates a method 200 utilizing the system 100 to generate individualized user representations that fit within a design paradigm. The method 200 may begin with operation 202 and the user capture device 104 is used to capture user features. For example, the user capture device 104 captures one or more user images 304 (see FIG. 5). In some embodiments, there may be multiple user images 304 captured, such as from different locations, viewpoints or the like. The number of user images 304 is selected based on the equipment to be sufficient to utilize photogrammetry techniques in order to measure landmarks and other locations on the user's face or other aspect being used for the avatar (e.g., legs, hands, etc.). In some instances, there may be 10-20 images and preferably 12 images that are captured of the user 106. In embodiments where the avatar 108 includes colored aspects, the user images 302 include color information, such as the color of the user's 106 hair, eyes, skin tone, and the like.

The color information may be detected solely by the user capture device 104 or may be adjusted to account for abnormalities or environmental factors (e.g., lighting variations). For example, the images may be normalized to remove color aspects due to the environment lighting rather than the user's features. In some instances, the system may include arranged lighting sources to provide a more controlled environment for image capture, e.g., uniform lighting.

Additionally, in some embodiments, depth images or other depth characteristics are detected during this operation 202. The depth information may be determined via the multiple user images 302 captured or may be completed as a separate step, such as a depth sensor or the use of other depth sensing techniques such as infrared and active stereo.

It should be noted that the user information captured in operation 202 may be destroyed or deleted after the avatar is completed, such that the system may not maintain records of the user information. The type and length of retention of the user information may be varied based on the implementation, user consent, and the like.

With reference again to FIG. 3, after operation 202, the method 200 proceeds to operation 204 and landmarks for the user 106 are detected. For example, the processor 120 analyzes the user images 302 to determine locations and shapes of user features, e.g., face shape, hairline 304, ears 310, eyes 314, nose 308, mouth 316, glasses, etc. In one embodiment, computer vision techniques that compare pixel colors and locations in the user images 302 may be used to detect the desired user features. For example, computer vision techniques utilizing segmentation can be applied that use foreground and background extraction techniques to determine locations of certain facial features. Some embodiments may use color information to determine features, e.g., skin color versus hair color can be used to identify eyebrows, facial hair, etc., such as by using probability assessments. For example, the processor can analyze an image and determine based on color and/or location within the frame whether a particular pixel may be more likely to be a portion of the forehead or a portion of the eyebrow. In another example, an AI classifer can be used to conduct the image analysis and identify the facial features of users. To this end, the system may use algorithmic techniques, trained AI models, or the like, to determine the facial features.

In some embodiments, an orientation or alignment frame may be used to assist in capturing the user images, such that the user aligns their face within a "frame" displayed over an image of the user's face. This type of alignment may assist in expending the feature detection since locations of certain features may be likely to correspond to certain pixels or locations within the frame.

Using the identified features, feature masks 320, 322 may be generated in operation 204 that mask the outline of certain user features, such as a hairline mask 320 and eyebrow mask 322 that identify the location and perimeter of the facial or other features. The feature masks 320, 322 are generated based on a perimeter shape as identified during the detection of the user features.

After operation 204, the method 200 may proceed to operations 206, 210, 216, which may be completed in parallel or in series to one another. In operation 206, the processor 120 uses the user images 304 to classify colors of the user features, such as the user's skin 306 color, eye color, hair color, eyebrow color, and the like. In one example, the processor 120 may conduct a pixel hue analysis around each of the locations determined to correspond to the selected landmark in operation 204. For example, a select group of pixels may be identified in operation 204 as corresponding to the eyebrows 312 and the hue and brightness of the pixels can be compared to a color chart or lookup table corresponding to selected color buckets or quantized groups, e.g., color falling into a selected range of X-Y is classified as a first color and color falling into a selected range of A-B is classified as a second color. In another example, the color of the user feature may be classified based on a closest approximation, e.g., whatever color within the classification database that the color resembles may be selected. In other words, a best fit analysis may be used to classify the color or other feature for the user. In some embodiments, infrared sensors can be used to analyze color in the user images. In some instances, the user's hair may be identified as corresponding to two or more colors, e.g., brown hair with substantial blonde highlights. In these instances, the system may select the dominant color first for an assessment of the color. However in other examples, the classified colors may include blended color mixes and the selection of an avatar hair color may be based on both dominant and highlight colors.

It should be noted that certain user colors may be compared to naturally occurring colors, as well as optionally artificial colors. For example, some users may have pink or purple hair from hair dye and certain artificial colors may be captured with the analysis. The spectrum of identified colors may be varied based on the avatar paradigm, human fashion trends, or the like. As such, the discussion of any particular number of color combinations or detectable hues should be understood to be variable as desired or needed.

When the color features of the user are classified, the method 200 may proceed to operation 208 and the processor 120 selects avatar feature colors for the user's avatar 108. The feature colors may be determined by comparing the user's classified colors to an avatar database stored in memory 126 that includes colors that fit within the selected paradigm for the avatar 108. In other words, the selected avatar feature colors may not exactly match the user, but match a corresponding avatar color for the desired application or avatar type. For instance, some avatars may not have human skin tones, but may have a range of skin colors that can be translated to human skin tones, and so if the user's skin tone is classified as very light human skin tone, a very light avatar skin tone may be selected. The selected avatar feature colors may be stored in the memory 126 after selection and the method 200 may proceed to operation 218 where the avatar 108 is built and the color selections applied.

With reference again to FIG. 3, while the color features are being determined, the method 200 may also detect select feature characteristics. In particular, in operation 210, the processor 120 extracts certain feature shapes and other non-color characteristics from the user images 302. For example, the landmark masks 320, 322 generated in operation 204 are used to extract feature characteristics, such as the shape or boundary, of the selected images.

Figure 7:
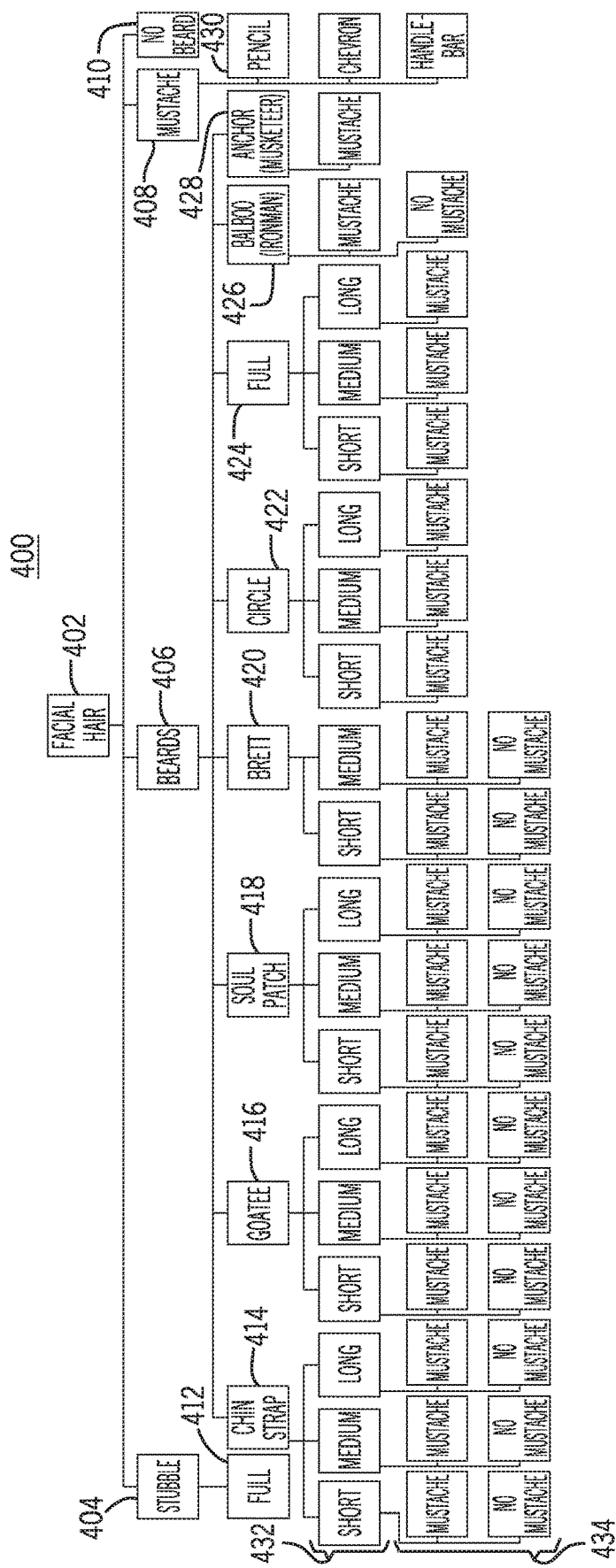
FIG. 7 is an example of an avatar classification tree used by the method of FIG. 3.

Once the user features have been extracted, the method 200 proceeds to operation 212 and the features are classified by the processor 120. In particular, the feature shapes and characteristics are classified as being a category, type, and subtype of feature shape classified within the avatar database stored in memory 126. Similar to the color classification, the shape classification may be done via a best fit analysis. As an example, FIG. 7 illustrates a classification tree 400 for a user facial hair feature 402. The facial hair 402 on a user may be classified as having a shape matching a category 404, 406, 408, 410 such as stubble 404, beard 406, mustache 408, or no beard 410, and under each broad category 404, 406, 408, 410 may be further classification options or types, such the category beards 406 may include types of chin strap 414, goatee 416, soul patch 418, brett 420, circle 422, full, balboo 424, and/or anchor 428, each of which may be determined by detecting the shape of facial hair and/or position on a user's face.

In addition to the category and type, each type may include a further subtype such as length 432 (e.g., short, medium, or long) and/or mustache presence 434 (e.g., mustache, no mustache). The subtypes are variable, but often for hair may be based on a hair length such as short, medium, or long, where short corresponds to a short hair length having length between A to B inches, medium corresponds to C to D inches, and long corresponds to length over D, where the specific inches intervals depend on the paradigm or other use desires. In operation 212, the processor 120 may do a best fit type of analysis using the extracted shape of the user features, as well as image information that may detect characteristics (e.g., hair length or texture). For example, a perimeter outline of the hair locations may be compared to the categories and types to determine the specific "bucket" that the user's hair shape most likely matches. Additionally, in instances where hair texture is detected, this may be done by analyzing a perimeter curve shape corresponding to the user's head shape. For example, if the top perimeter outline is a noisy curve as compared to a flatter curve, the user may be determined to have curvy hair. The more noise in the curve the tighter the hair curls. In other examples, can use different AI filters or models to determine the curliness of a user's hairline.

It should be noted that the categories, types, and subtypes may be varied as desired, detected user features, as well as varying fashion trends (e.g., facial hair styles captured as selected types may be updated to account for variations in fashion or the like). Subtypes may include lengths, as well as texture options, such as curly, straight, wiry, thin, thick, or the like, as well as density and mass determinations.

In one example, there may be 13 nose shapes of 3 different lengths and sizes, three different jaws, 0-100% for eye depth (e.g., scalable), and 7 different head shapes (e.g., round, pear, square, and so on). However, other category types and shape types may be used and depend on the desired aesthetic context or avatar paradigm.

Once the user's particular features are classified as belonging to a selected user grouping of features, the method 200 proceeds to operation 214 and the processor 120 selects an avatar feature characteristic corresponding to the user's classified feature. For example, if the user's facial hair is classified as being a short length chin strap with no mustache, the processor 120 may compare the category, type, and subtype determinations to corresponding avatar features, which may be determined by referencing an avatar feature database or lookup table stored in memory 126. The avatar feature database includes similar categories and types as the categories and types for the user identification. Using the avatar feature database, the processor selects an avatar feature that matches the category, type, and subtype(s) of the user feature. It should be noted that in some instances, multiple user category, types, or subtypes may be grouped into one or more avatar category, types, and subtypes (e.g., the avatar paradigm may not include all selected categories, types, or subtypes and user classifications falling within those categories, types, or subtypes may be matched with an avatar feature having a different category, type, or subtype). After the avatar feature characteristics are selected, the method 200 proceeds to operation 218 and the avatar 108 is built with the selected characteristics and feature colors.

Figure 4:
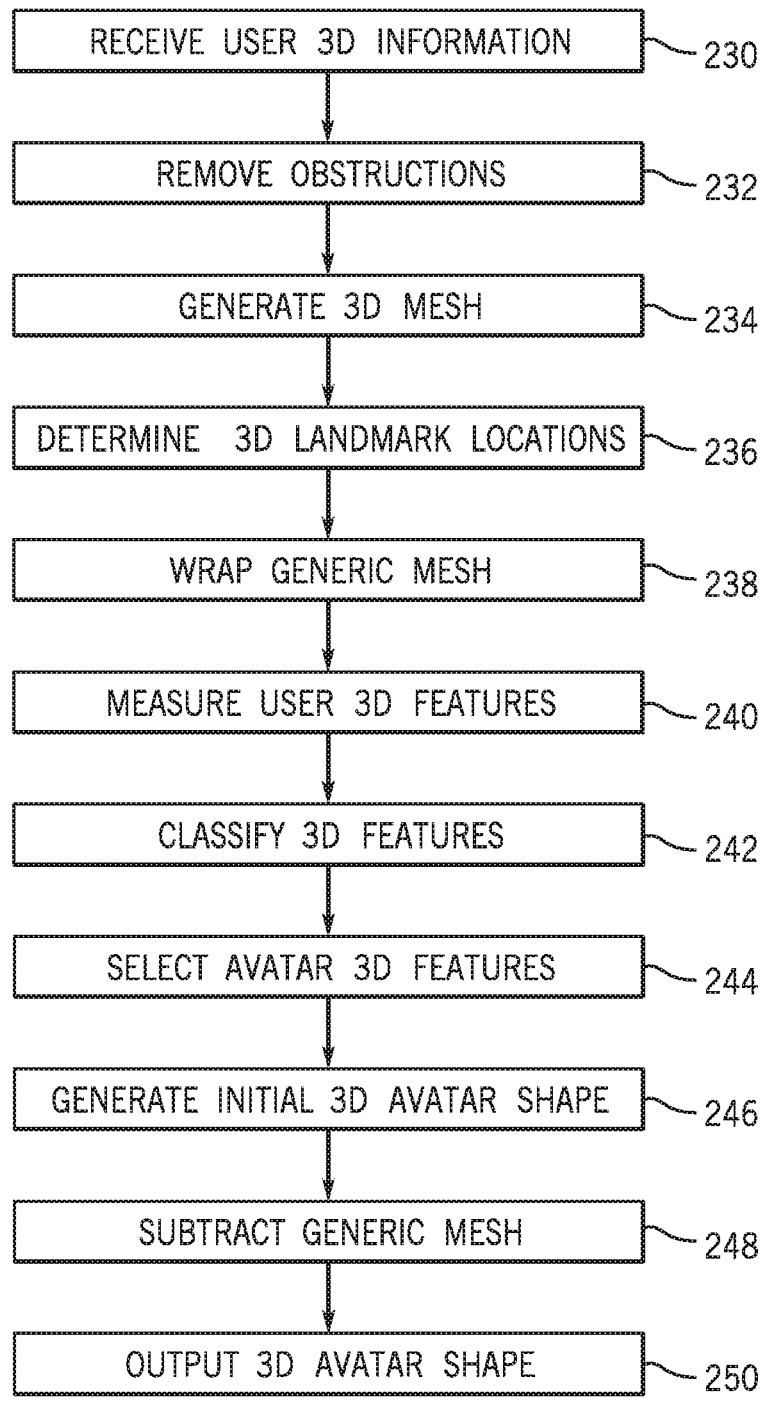
FIG. 4 is a flow chart illustrating a step of the method of FIG. 3.
Figure 8A:
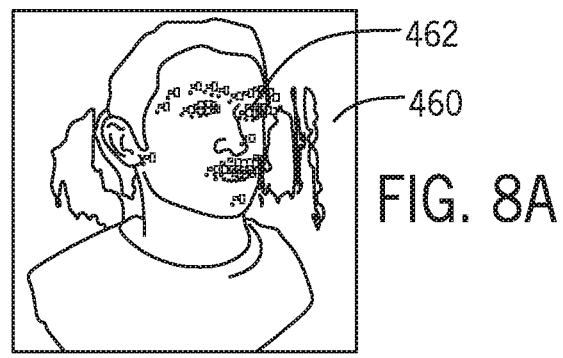
FIG. 8A is an example of a user depth information as captured by the system of FIG. 1.

With reference again to FIG. 3, after the landmarks are determined in operation 204, the method 200 may also proceed to operation 216 and the 3D avatar shapes may be determined. An example of operation 216 is shown in FIG. 4. As shown in FIG. 4, operation 216 may begin with step 230 and the processor 120 receives user 3D information from the user capturing device 104. The user 3D information, may include depth information corresponding to user facial or other features, e.g., eyes, eyebrows, nose, and the like. For example, FIG. 8A illustrates a user depth capture 460 include geometric information corresponding to selected user features 462.

After the user information 462 from the captured user information 460 is received, operation 204 proceeds to step 232 and the processor 120 removes obstructions, if present, from the user information captured in operation 202. For example, the landmarks are used to determine if the user includes obstructions, such as bangs, facial hair, or the like, that may interfere with a 3D mesh of the user. Obstructions may be determined by using the eyes and mouth as landmarks and anything other than skin color detected above the eyes or around the mouth may be disregarded. In one example, the masks 320, 322 generated in operation 210 may be used to identify the location and shape of certain obstructions to allow their removable. For example, a Boolean operation can be used to determine if there is 3D data that falls inside the mask or outside the mask. Information falling within the mask may be disregarded since it may be assumed to be incorrect, e.g., bangs on a user's forehead may be detected as raised 3D protrusions on a user's forehead and since these protrusions fall within the facial hair mask (which may be detected via color, AI, or the like) the protrusions are disregarded and not incorporated into the topographical 3D mesh of the user's face. In this example, a border is selected around the feature mask, such as $\frac{1}{12}$-$\frac{1}{4}$ of an inch that is analyzed both above and below the location of the mask and a color determine may be used to determine if the border area is skin or hair and if hair the information is not incorporated into the mesh. The border area and/or operations used to detect the obstructions may be varied as desired.

Figures 8B, 8C:
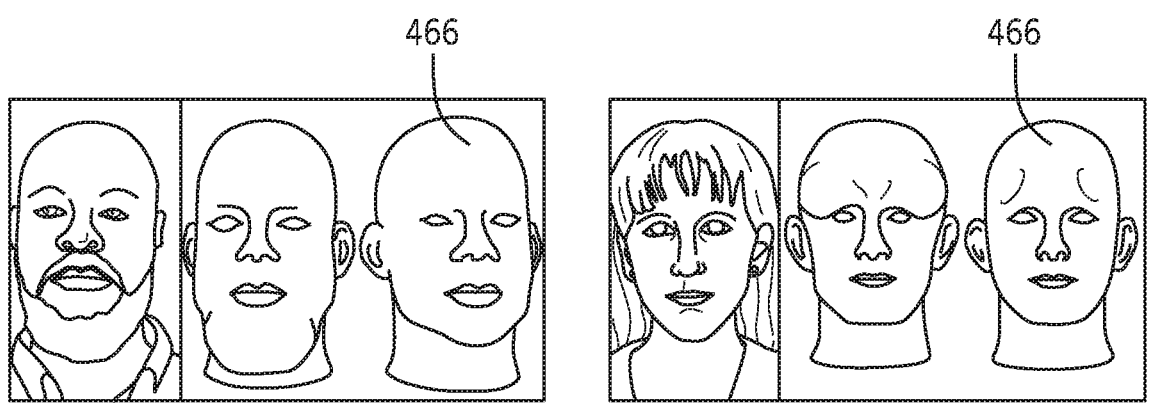
FIG. 8B is an example of a user mesh generated with obstructions and without obstructions.
FIG. 8C is another example of the user mesh generated with and without obstructions.

FIGS. 8B and 8C illustrate user images with obstructions, facial hair and bangs, respectively, as compared to a first 3D shape generated without the obstructions removed and a second 3D shape generated with the obstructions removed. In some embodiments, to "remove" the obstructions, certain characteristics of the user's facial structure (e.g., jawbone shape and length or forehead shape and length) may need to be estimated. In these embodiments, the other user facial information, can be used to estimate the omitted information.

After operation 232, operation 216 proceeds to step 234 and a user 3D mesh is generated. For example, the processor 120 uses the landmark information and depth information detected in the user 3D information to generate a user mesh, e.g., a 3D geometric representation or point cloud corresponding to the user's features. FIGS. 8B and 8C illustrate examples of the initial user 3D mesh 464, 466.

Figure 9A:
FIG. 9A is an example of a user mesh.

Once the user's initial mesh is generated, operation 216 proceeds to step 236 and the 3D locations are identified on the 3D mesh. FIG. 9A illustrates an example of a user mesh 468 with the 3D landmarks identified. As shown in FIG. 9A, the landmarks may be overlaid on the user mesh 468. In one example, the location of the landmarks may be determined by image analysis and then using photogrammetry techniques, the locations of the landmarks identified and overlaid on the locations in the 3D mesh. Additionally, the 3D landmarks of the user are then identified on a generic mesh. In other words, the landmarks of the user that were captured during the user scan or capture operation (e.g., eyes, nose, mouth), are identified in the generic mesh, with the generic mesh including the same number of landmarks that were identified in the user mesh. In one example, when one or more 2D user images are captured and used to generate the 3D shape, a lookup table or other point translation between the 2D and 3D locations may be performed to correlate a particular 2D feature location to a 3D location on the mesh.

Figure 9B:
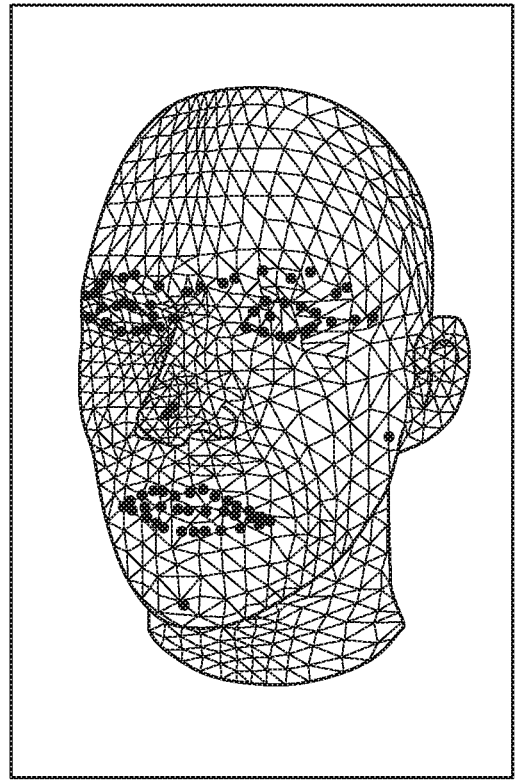
FIG. 9B is an example of the wrapped user mesh.

With the locations of the 3D landmarks identified on the user mesh, operation 216 proceeds to operation 238 and the user mesh 468 is wrapped with a generic mesh. For example, the landmarks are used to align the generic mesh and the user mesh 468 and the generic mesh is wrapped over the guest mesh 468. The generic mesh includes a full measureable geometric of a standard user face and the landmarks are aligned to ensure that the generic mesh is wrapped properly around the user mesh 468. FIG. 9B illustrates the wrapped mesh 470 with the landmarks 472 being aligned with those identified on the user mesh 468. In some embodiments, there may be generic meshes for adult and children faces and optionally by gender as well (e.g., generic male face mesh and generic female face mesh). In one example, barycentric coordinates are determined for the user mesh 468, as well as the generic mesh. Then 3D landmarks from the user are corresponded to similar landmarks on the generic mesh. From there, an iterative closest point solving algorithm may be executed by the processor to output a constant topology for the user.

The wrapped mesh 470 then includes a measurable geometry and the measurements for landmark or anchors dimensions can be more easily and accurately determined. For example, comparing FIGS. 9A and 9B, the landmark locations in the user mesh 468 are clustered and difficult to analyze, but once wrapped with the generic mesh, the wrapped mesh 470 includes the landmarks spaced at the right locations and the mesh is oriented in the correct direction. In one example, the wrapping step acts to create a duplicate of the scanned user mesh, but with clean geometry that can be measured and extracted.

After step 238, operation 216 proceeds to step 240 and the user's features and landmarks are measured on the wrapped mesh 470. For example, the processor 120 uses the vertices of landmarks to determine measurements for height, width, and other measurable characteristics (e.g., perimeter boundary). In one example, the measurements may be determined based on vertices in the mesh, e.g., a nose is determined to span between vertex 352 and vertex 365. Other measurement techniques may be used as well, e.g., pixels, inches, centimeters, etc.

Figure 10:
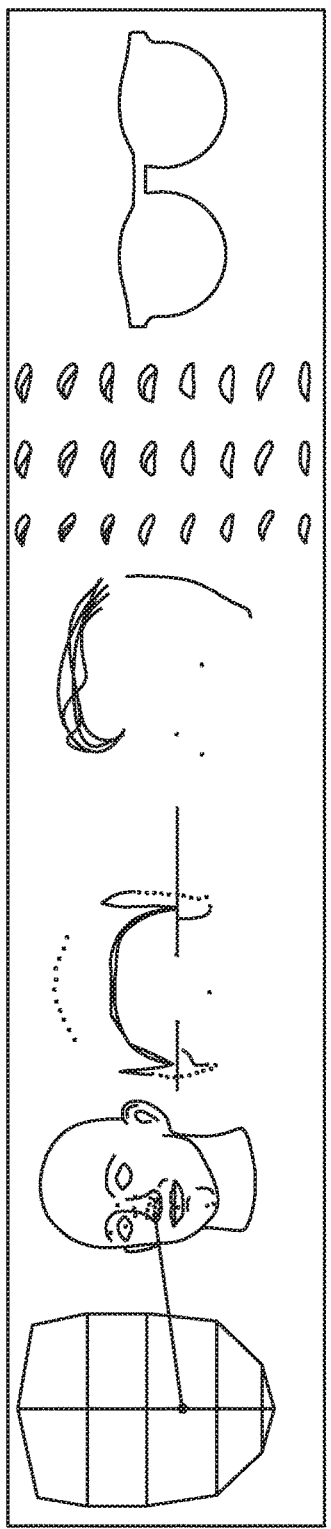
FIG. 10 is an example of measurements for facial features and accessories.

With the user features measured, operation 216 proceeds to step 242 and the user's features are classified. As described in operation 212, the user features may be classified based on a "bucket" or quantized approach. In particular, the normalized measurements from the wrapped mesh 470 can be compared to avatar measurement groups, e.g., small nose is anything smaller than X number of vertices, medium nose ranges from Y to Z number of vertices, and large nose is everything larger than Z vertices. It should be noted that the category ranges for the different features may vary based on the feature type, as well as the selected avatar or user characteristics (e.g., adult male, adult female, child, etc.). FIG. 10 illustrates an example of measurement of face shapes, hair components, eyebrows, and glasses using the vertices of the wrapped mesh 470.

After the user features are classified, operation 216 proceeds to step 244 and the avatar features are selected. In particular, similar to operation 214, the processor 120 uses the classification buckets to translate the user feature into an avatar feature having the same category, type, and subcategories. A classification tree or other type of translation table may be used to correspond a user classified feature into an artistic representation of the user feature, e.g., a large avatar nose, medium avatar nose, and/or small avatar nose. A classification tree can also be used for head shape as well, e.g., whether the user's head is diamond, square, heart, triangular, round, or oval shaped, or which shape best describes the user's head shape, and this may be used to build the initial avatar. The classification process may include a best analysis that matches the user's shape to a predetermined category and/or type.

Figure 11:
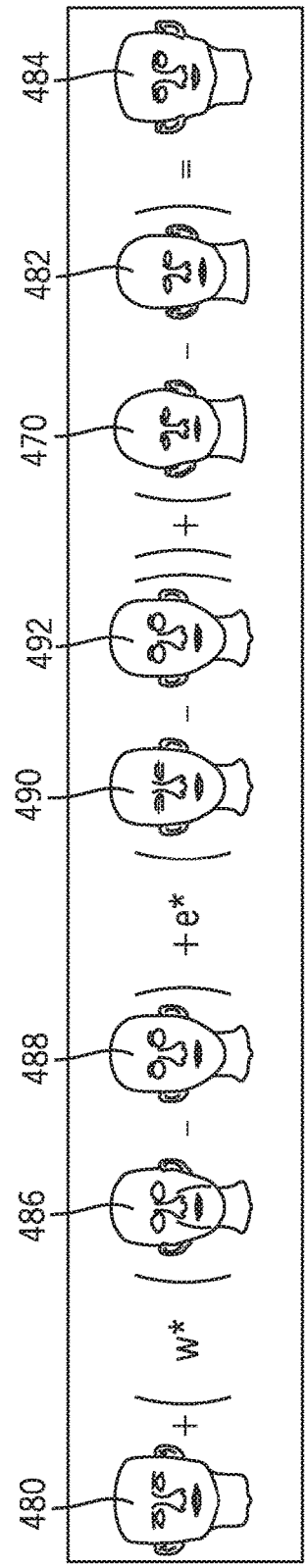
FIG. 11 is a graphical illustration of a combination process to generate an avatar using the method and steps of FIGS. 3 and 4.

The operation 216 may then proceed to operation 246 and an initial avatar shape is generated by the processor 120. For example, the processor 120 uses the classified shapes to generate an initial avatar 480 (see FIG. 11) by selecting the feature shapes based on the classified elements, where the feature shapes correspond to a design paradigm for the selected avatar, rather than a pure representation of the user. In one embodiment, a head shape, size, nose shape, mouth shape, and other locational information, is used to select avatar features that are then combined together to form the initial avatar 480. Additionally, the avatar initial shape 480 is combined with additional guest individualized features, such as wrinkles, eye shape, ear shape, eye lash length, etc. In one embodiment a wrinkle factor is applied to the initial avatar 480, where the wrinkle factor is determined based on an age of the user, which may be input or detected (e.g., by image analysis identifying wrinkles or other age identification characteristics) and be a range or value (e.g., 0-100%), illustrated in FIG. 10 as extreme wrinkle avatar 486 and user wrinkle avatar 488. As another example, an eye factor, which may correspond to an eyeball or eye socket height or size, may be determined by a similar factor. For example, if the user falls within an eye shape corresponding to a 10% of users, than an eye factor of 0.1 may be applied to the initial avatar shape 480 to adjust for the user's specifics. As shown in FIG. 10, an eye shape end point (e.g., 100% factor) is reduced by the user's specifics to generate an eye factor for the initial avatar 480.

Once the avatar is generated and select factor adjustments are complete, operation 216 proceeds to operation 248 and the generic mesh 482 is subtracted from the wrapped user mesh 470. For example, the processor 120 extracts differences between vertices on the wrapped user mesh 470 and vertices on the generic mesh 470 to remove any incidental impact on the avatar shape imported by the generic mesh (see e.g., FIG. 10). In this manner, the user mesh may be a unique output to the user that does not include the facial shapes import by the 3D mesh.

In one example, the extraction is used to determine a delta between feature locations on the generic mesh as compared to the user mesh, such that the system can utilize and store the deltas, rather than a full user mesh, when generating the avatar. For example, the 3D user mesh can be analyzed to determine a vector between a selected point (e.g., end of the nose) between the user wrapped mesh and the generic mesh. The vector may then be stored, rather than the actual user mesh information, and used to recreate the user mesh or build the avatar, since the system will apply the delta to the generic mesh to arrive at the user mesh, rather than storing the original user mesh. In these embodiments, security may be enhanced for the system, as certain processing, such as the building of the avatar, that may be done remotely or on a cloud server, may not need to receive the user specific mesh and data, only deltas information. This reduces the transfer of personal information for the user between devices. Further, by sending the delta information, rather than a full 3D mesh, the data transfer between the cloud and the computer or between computing devices, is reduced, increasing speed and efficiency. In this instance, once the delta or distances between the generic mesh and the user mesh are determined, the user mesh can be discarded or destroyed, since the system may not need to further reference the full user mesh.

Operation 216 then proceeds to step 350 and the avatar 3D shape 484 is output. The avatar 3D shape 484 includes the selected features falling within the avatar design paradigm, but that are based on the distinct user features detected and measured.

Figure 12:
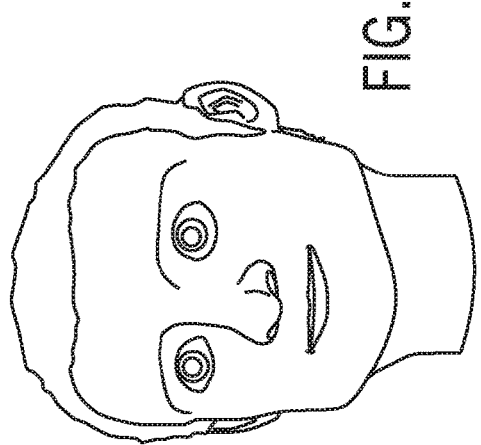
FIG. 12 is a personalized stylized avatar generated using the system of FIG. 1.

With reference again to FIG. 3, once the 3D avatar shape 484 is generated, the colors and feature characteristics determined in operations 208 and 214, respectively, are combined in operation 218 when the processor 120 builds the avatar. For example, the processor 120 combines the selected facial features (e.g., facial hair, hairline, accessories, or the like), with the avatar colors (e.g., hair color, eye color, skin color), onto the avatar 3D facial shape to generate the actual avatar icon 492 (see FIG. 12). The avatar 492 includes the structural features, illustrated features, and colors that correspond to the user, yet remain within the confines of the design language selected for the avatar. This allows avatars to be generated that appear to be similar to a user, but still fit within the design framework, e.g., allow a user to experience how a character inspired by the them may be represented within an animated movie or the like. In this manner, changes in the design paradigm may result in dramatically different appearances for the avatar, but still having an individualized aesthetic corresponding to the user. Furthermore, in some instances, the personalized avatar, which may be identifiable as the user, can be stored in the system and other user specific information (e.g., 2D images, 3D mesh, etc.) can be discarded. This may allow the system to provide a user engagement vehicle (the avatar) that is identifiable as the user, but does not contain user specific information, since the selected features are from the paradigm of avatar features, but assembled in a manner that is similar to the user. Using this representation, the actual personal information for the user can be destroyed, while still allowing the user to full engage with the system in a meaningful and individualized manner.

CONCLUSION

The methods and systems are described herein with reference to avatars generated based on user's faces. However, these techniques are equally applicable to other types of representative electronic representations of a user or character (e.g., animals, full human bodies, or the like). Additionally, although the discussions presented herein are discussed with respect to symmetrical features (e.g., eyes, ears, eyebrows), in some instances, each landmark may be identified separately, allowing the system to more accurately account for asymmetry between features, e.g., different eye heights, different eyebrow shapes, or the like.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method to generate individualized user-character avatars representative of a user's likeness and a character design framework associated with character design language, the method comprising:
　　receiving by a processor depth information corresponding to multiple user features of a user, wherein the multiple user features correspond to anatomical features of the user;
　　determining by the processor one or more feature landmarks for the user based on the depth information;
　　utilizing by the processor the one or more feature landmarks to classify a facial hair user feature by a facial hair category relative to an avatar facial hair feature category, the utilizing comprising:
　　　　generating by the processor a user mesh representing a three dimensional shape for at least the facial hair feature,
　　　　wrapping by the processor the user mesh with a generic mesh to generate a wrapped mesh, and
　　　　comparing the wrapped mesh representing the facial hair feature with a plurality of facial hair avatar features in the avatar facial hair feature category;
　　selecting, by the processor from an avatar feature database, a facial hair avatar feature from the plurality of facial hair avatar features in the avatar facial hair feature category based on the classification and comparison of the facial hair user feature such that the facial hair avatar feature is a facial hair avatar feature out of the plurality of facial hair avatar features that most closely matches the facial hair user feature, and wherein the facial hair avatar feature corresponds to the character design framework associated with the character design language, and wherein the facial hair avatar feature comprises a subtype;

combining by the processor the facial hair avatar feature with an avatar representation to generate an individualized user-character avatar representative of both the user's likeness and the character design framework associated with the character design language; and outputting by the processor the individualized user-character avatar to a display.

2. The method of claim 1, wherein the facial hair user feature is a first user feature further comprising:

receiving by the processor color information corresponding to the user features;

utilizing by the processor, the color information to classify a second user feature relative to an avatar feature category;

selecting, by the processor from the avatar feature database, a second avatar feature from the avatar feature category based on the classification of the second user feature; and combining by the processor the second avatar feature with the avatar representation to generate the individualized user-character avatar.

3. The method of claim 1, wherein wrapping the user mesh with the generic mesh further comprises aligning by the processor a generic mesh landmark with the one or more feature landmarks.

4. The method of claim 1, further comprising generating an avatar mesh based on the wrapped user mesh and the plurality of facial hair avatar features.

5. The method of claim 1, wherein the one or more feature landmarks comprises at least two feature landmarks and the facial hair user feature is a first user feature, the method further comprising:

utilizing by the processor one of the one or more feature landmarks to classify a second user feature relative to a second avatar feature category;

selecting by the processor a second avatar feature from the second avatar feature category based on the classification of the second user feature; and combining by the processor the facial hair avatar feature and the second avatar feature with the avatar representation to generate the individualized user-character avatar.

6. The method claim 5, wherein the second user feature corresponds to a hair line, an eye brow shape, a nose shape, a hair texture, or an eye brow texture.

7. The method of claim 6, wherein the facial hair user feature corresponds to a facial shape.

8. A system for generating individualized user-character avatars representative of a person's likeness and a character design framework associated with character design language, the system comprising:

a camera for capturing images of a person; and a computer in electronic communication with the camera, comprising:

a non-transitory memory component for storing a plurality of graphical features; and a processor in electronic communication with the memory and configured to perform the following operations:

receive the captured images of the person;

determine from the captured images a plurality of facial landmarks for the person;

utilize the plurality of facial landmarks to classify a first facial feature by a first category, a first type, a first subtype, or combinations thereof, relative to a first graphical feature category and a second facial feature, relative to a second graphical feature category, wherein the classified first facial feature is a first anatomical feature of the person corresponding to a facial hair characteristic of the person and the classified second facial feature is a second anatomical feature of the person different from the facial hair characteristic, and wherein the utilizing comprises:

generating a person mesh representing a three dimensional shape representation of the person's face, including at least the first facial feature and the second facial feature, wrapping a generic mesh over the person mesh to generate a wrapped mesh, and comparing the wrapped mesh representing the first facial feature and the second facial feature with a plurality of facial hair graphical features in the first graphical feature category and a plurality of facial hair graphical features in the second graphical feature category;

select, from an avatar feature database, a first graphical feature from the plurality of facial hair graphical features in the first graphical feature category based on the classification and comparison, wherein the first graphical feature is a graphical feature from the plurality of facial hair graphical features that most closely matches the first facial feature;

select, from the avatar feature database a second graphical feature from the plurality of graphical features corresponding to the second anatomical feature in the second graphical feature category based on the classification, wherein the second graphical feature is a graphical feature from the plurality of graphical features that most closely matches the second facial feature, and wherein the first facial feature and second facial feature correspond to the character design framework associated with the character design language, and wherein the first graphical feature and the second graphical feature comprises a subtype; and combine the first graphical feature and the second graphical feature together to generate an individualized user-character avatar representative of both the person's likeness and the character design framework associated with the character design language.

9. The system of claim 8, wherein the first facial feature classification is based on color and the second facial feature classification is based on shape.

10. The system of claim 8, further comprising subtracting the generic mesh from the wrapped mesh to output an avatar mesh corresponding to an avatar facial shape.

11. The system of claim 9, wherein the processor is further configured to:

utilize one or more of the facial landmarks to identify obstructions on the person images;

generate the person mesh corresponding to the three dimensional representation of the person's face, wherein identified obstructions are removed from the person mesh; and utilize the person mesh to generate the avatar mesh, wherein the avatar mesh is used to classify the second facial feature.

12. The system of claim 8, wherein the first graphical feature and the second graphical feature, from the avatar feature database, correspond to the character design framework associated with the character design language.

13. A method to generate individualized user-character avatars representative of a user's likeness and a character design framework associated with character design language, the method comprising:

receiving by a processor depth information corresponding to a facial feature of the user, wherein the facial feature corresponds to a facial hair feature of the user;

detecting by analyzing the depth information by the processor, a location of the facial feature;

quantizing by the processor the facial feature, by a category, a type, a subtype, or combinations thereof, into a respective avatar facial feature type, the quantizing comprising:

generating a user mesh corresponding to a three dimensional shape representation of the user's face, wrapping a generic mesh over the user mesh to generate a wrapped mesh, and comparing the wrapped mesh representing the user's face with a plurality avatar facial hair elements;

selecting, from an avatar feature database, avatar facial hair elements from the plurality of avatar facial hair elements to an individualized user-character avatar based on the respective facial feature type and the depth information, wherein the selected avatar facial hair elements are those from the plurality of avatar facial hair elements that most closely match facial feature of the user and correspond to the character design framework associated with the character design language;

generating the individualized user-character avatar by the processor by combining the avatar facial elements together, wherein the individualized user-character is representative of both the user's likeness and the character design framework associated with the character design language; and outputting by the processor to a display the individualized user-character avatar for display.

14. The method of claim 13, wherein the avatar facial feature type is selected, from the avatar feature database, to correspond to the character design framework.

15. The method of claim 13, wherein quantizing by the processor comprises at least one of:

determining an avatar facial feature shape that is similar to a user facial feature shape;

determining an avatar facial feature color that is similar to a user facial feature color; or determining an avatar facial feature size that is similar to a user facial feature size; wherein the avatar facial feature shape, the avatar facial feature color, and the avatar facial feature size do not directly match the user facial feature shape, the user facial feature color, or the user facial feature size, respectively.

16. The method of claim 1, wherein the facial hair category comprises at least a stubble category, a beard category, a mustache category, a no beard category, or combinations thereof.

17. The method of claim 1, wherein a facial hair type comprises at least a chin strap type, a goatee type, a soul patch type, a brett type, a circle type, a full type, a balboo type, an anchor type, or combinations thereof.

* * * * *